(12) United States Patent
Williams

(10) Patent No.: US 10,596,951 B1
(45) Date of Patent: Mar. 24, 2020

(54) POP-UP CAMPER SHELL FOR PICKUP TRUCK AND VEHICLE ROOF

(71) Applicant: Ross Williams, Denver, CO (US)

(72) Inventor: Ross Williams, Denver, CO (US)

( * ) Notice: Subject to any disclaimer, the term of this patent is extended or adjusted under 35 U.S.C. 154(b) by 170 days.

(21) Appl. No.: 15/951,285

(22) Filed: Apr. 12, 2018

Related U.S. Application Data

(60) Provisional application No. 62/484,962, filed on Apr. 13, 2017.

(51) Int. Cl.
  *B60P 3/34* (2006.01)
  *B60J 7/16* (2006.01)
  *E04H 15/06* (2006.01)
  *B60P 3/39* (2006.01)

(52) U.S. Cl.
  CPC ............. *B60P 3/341* (2013.01); *B60J 7/1621* (2013.01); *B60P 3/39* (2013.01); *E04H 15/06* (2013.01)

(58) Field of Classification Search
  CPC ..... B60P 3/341; B60P 3/39; B60P 3/38; B60J 7/1621; E04H 15/06
  USPC ........................................................ 296/160
  See application file for complete search history.

(56) References Cited

U.S. PATENT DOCUMENTS

| | | | |
|---|---|---|---|
| 2,291,900 A * | 8/1942 | Jimmes | B60P 3/38 135/88.13 |
| 3,021,852 A * | 2/1962 | Hoffman | B60P 3/38 135/88.18 |
| 3,145,046 A | 8/1964 | Om et al. | |
| 3,288,518 A | 11/1966 | Oliver | |
| 3,582,129 A | 6/1971 | Frank | |
| 3,712,316 A * | 1/1973 | Leonard | B60P 3/38 135/88.16 |
| 3,758,148 A | 9/1973 | Sowma | |
| 3,762,759 A | 10/1973 | Hall | |
| 4,176,873 A | 12/1979 | Barr et al. | |
| 4,251,102 A * | 2/1981 | Lee | B60P 3/38 135/88.16 |
| 4,548,438 A * | 10/1985 | Myers | B60P 3/38 135/88.16 |
| 5,203,364 A | 4/1993 | Koole | |
| 7,246,839 B1 | 7/2007 | Nyberg | |
| 7,914,064 B2 | 3/2011 | Joab | |
| 10,086,684 B1 * | 10/2018 | Stamm, Jr. | B60J 7/1621 |
| 2008/0084089 A1 | 4/2008 | Hanson | |
| 2011/0109120 A1 | 5/2011 | Bonerb | |
| 2015/0292230 A1 * | 10/2015 | Park | E04H 15/06 135/88.13 |

(Continued)

*Primary Examiner* — Jason S Morrow
(74) *Attorney, Agent, or Firm* — Shifrin Patent Law; Dan Shifrin

(57) ABSTRACT

A pop-up camper shell is provided, comprising: slide rails; a bed platform slideable along the slide rails; a pop-up top hingedly secured to a front of the bed platform; and a tent secured between the top of the tray and bed platform and the bottom of the pop-up top. The slides of the camper shell are securable to the roof of a vehicle. Alternatively, the camper shell may also include a tray, secured to the top of a shell body and having an opening to which the slides are secured. The tray is securable within the bed of a pickup truck. When the bed platform is in its forward position and the pop-up top in a raised or tilted position, the tent deploys to define an enclosed space accessible through an opening in the roof of the vehicle or from the truck bed through the opening in the tray.

18 Claims, 19 Drawing Sheets

(56) References Cited

U.S. PATENT DOCUMENTS

2019/0112831 A1\* 4/2019 Attema .................. E04H 15/48
2019/0292806 A1\* 9/2019 Attema ..................... B60P 3/34

\* cited by examiner

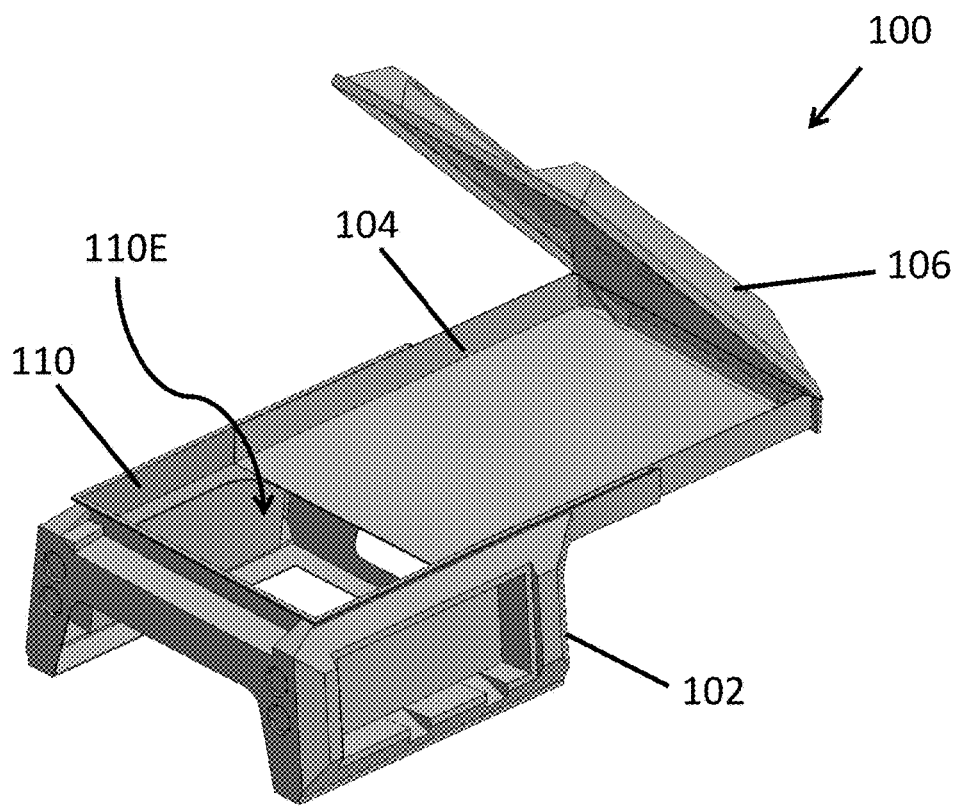
FIG. 11
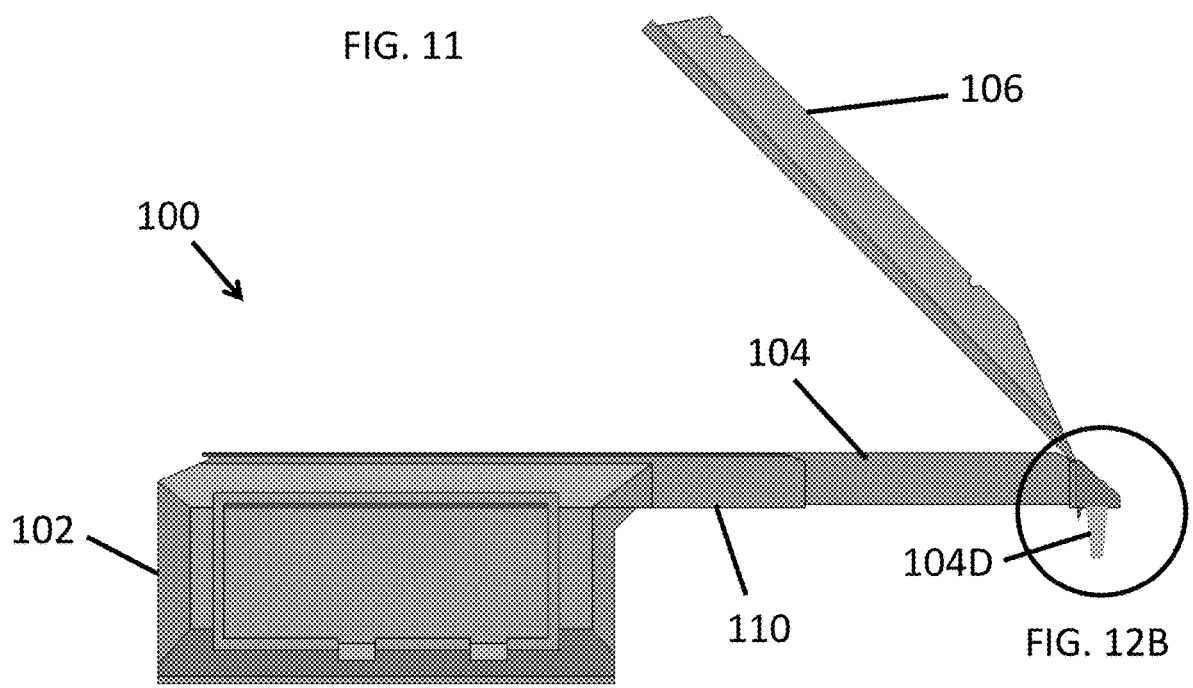
FIG. 12A
FIG. 12B

POP-UP CAMPER SHELL FOR PICKUP TRUCK AND VEHICLE ROOF

RELATED APPLICATION DATA

The present application is related to and claims the benefit of commonly-owned and U.S. Provisional Patent Application Ser. No. 62/484,962 entitled POP-UP CAMPER SHELL FOR PICKUP TRUCK, filed on Apr. 13, 2017, which application is incorporated herein by reference in its entirety. The present application is also related to commonly-owned and U.S. Design patent application Ser. No. 29/600,530 entitled POP-UP CAMPER SHELL FOR PICKUP TRUCK, filed on Apr. 13, 2017, which application is incorporated herein by reference in its entirety.

TECHNICAL FIELD

The present invention relates generally to recreational vehicles and, in particular, to camper shells for pickup trucks and vehicle roofs.

BACKGROUND ART

Camping is an extremely popular activity and being able to take one's living quarters with one's vehicle allows many who would prefer not to stray from the road to still enjoy being in the outdoors. Although dedicated recreational vehicles (RV's) are in widespread use, they are expensive, take up valuable space when not in use, and may have limited off-road/rough road capability. Towed trailers are also common but, like RV's, take up valuable space when not in use, and may have limited off-road/rough road capability.

Camper tops or shells that fit onto the back of pickup trucks are less expensive than dedicated RV's or camper trailers, make use of existing vehicles, and make it easier to travel in areas that RV's and trailers may be unable to negotiate. Thus, integrating the living quarters with the vehicle enhances the convenience of camping.

There are numerous types of camper shells. Many simply attach to the top perimeter of the pickup truck bed. There is generally some inside space over the roof of the truck cab with only a little head-room that is adequate for sleeping but nothing else. For added head-room above the main area in the truck bed, some shells have tops that can be raised. Nonetheless, space is always limited.

SUMMARY OF THE INVENTION

Embodiments of the present invention provide a pop-up camper shell. The shell comprises: a pair of slide rails; a bed platform slideable along the slide rails from a rearward position to a forward position; a pop-up top hingedly secured to a front of the bed platform, the pop-up top having a closed position covering the bed platform and a tilted position; and a tent. The tent comprises: a pair of opposing sides secured along bottom edges to the sidewalls of the tray and the bed platform and secured along top edges to bottom side edges of the pop-up top; and a rear panel secured along a bottom edge to the rear wall of the tray and secured along a top edge to a rear edge of the pop-up top. The slides of the camper shell are securable to the roof of a vehicle. When the bed platform is in its forward position and the pop-up top in its tilted position, the tent deploys to define an enclosed space accessible through an opening in the roof of the vehicle.

Alternatively, the camper shell may also include a tray having an opening to which the slides are secured. The tray is secured to the top of a shell body, which is securable within the bed of a pickup truck. When the bed platform is in its forward position and the pop-up top in its tilted position, the tent deploys to define an enclosed space accessible from the truck bed through the opening in the tray.

BRIEF DESCRIPTION OF THE DRAWINGS

FIG. 11 is a right rear perspective view of the camper shell of the present invention in the fully open position;

FIG. 12A is a right side view of the camper shell of the present invention in the fully open position;

Figure 16A:
Figure 16A:
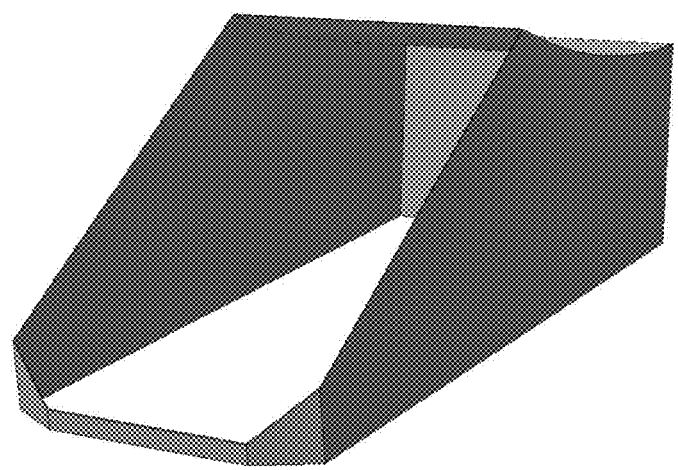
Figure 16B:
Figure 16B:
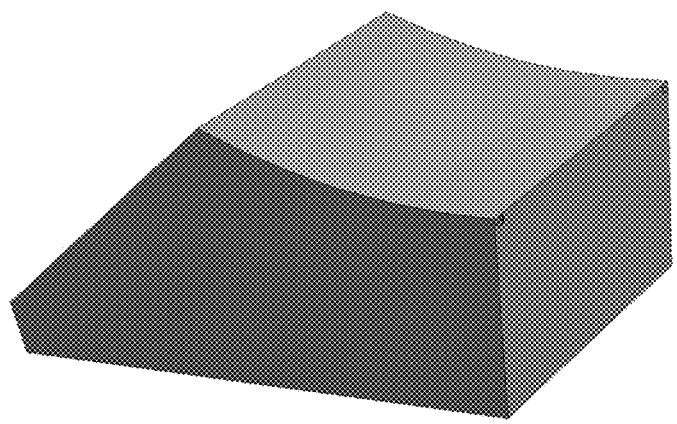
Figure 16C:
Figure 16C:
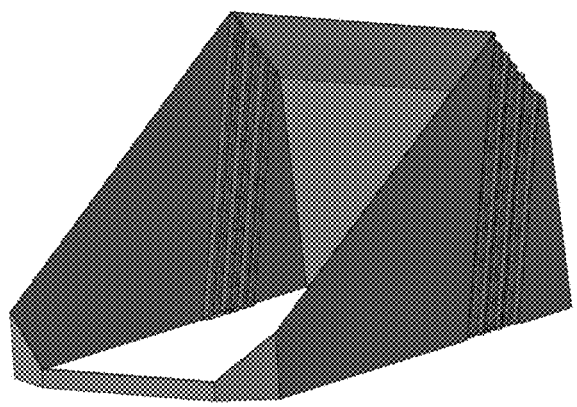
Figure 17A:
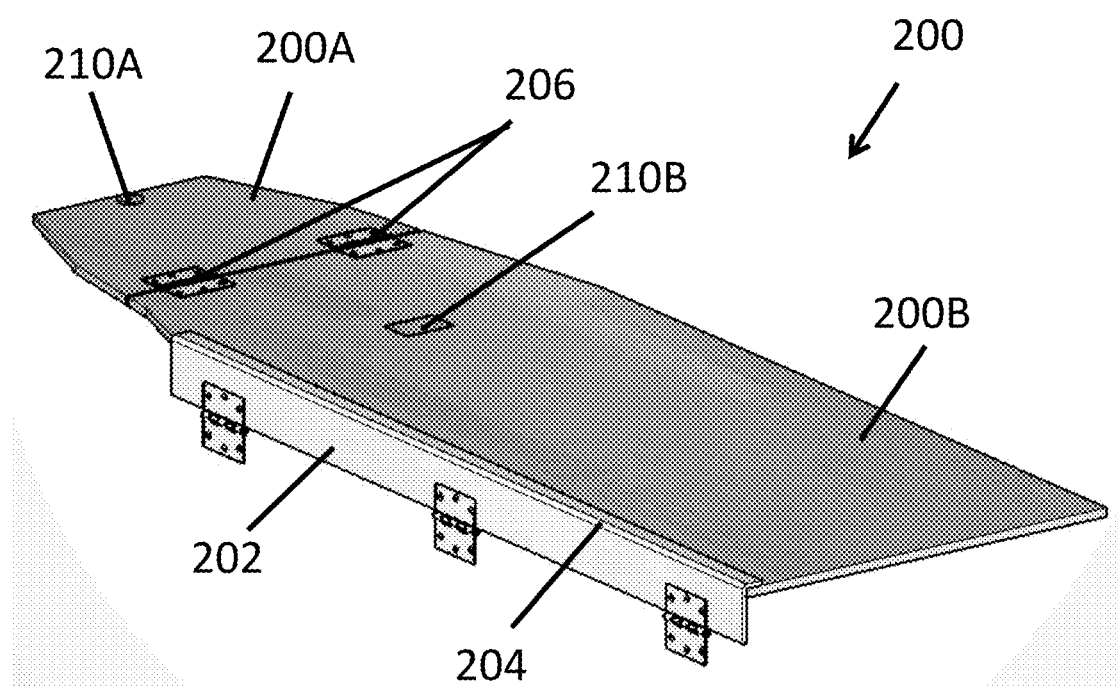
Figure 17B:
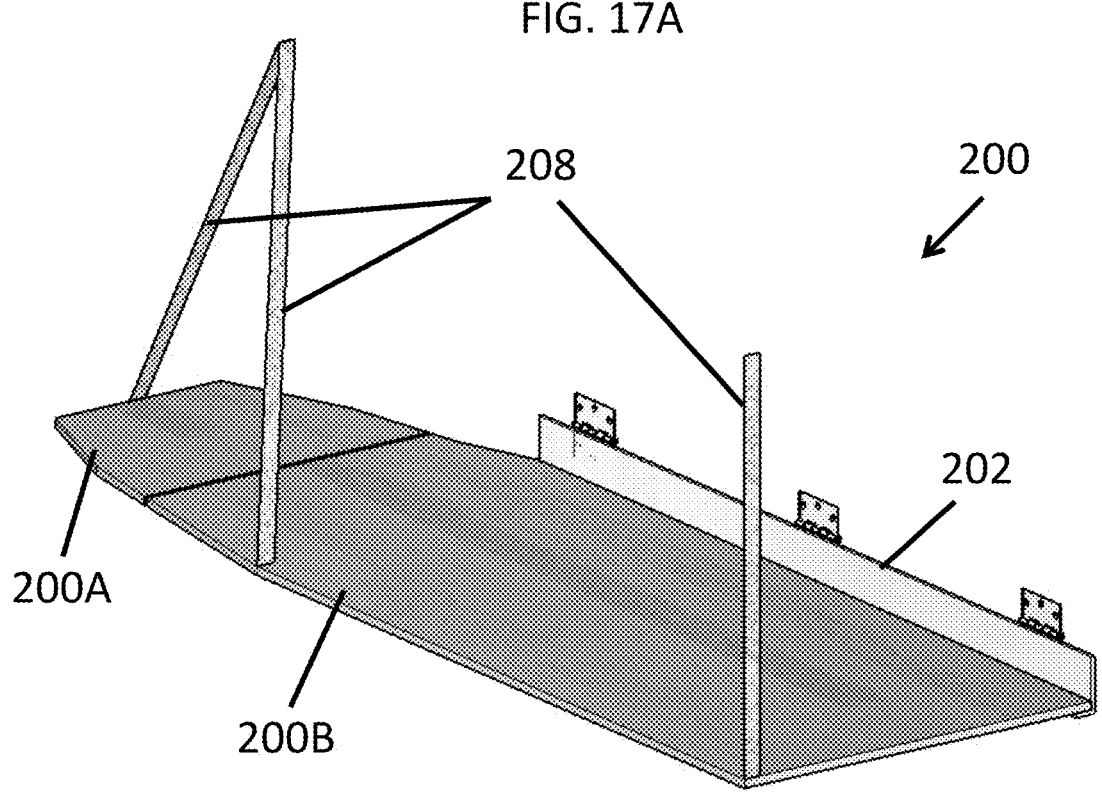
Figure 17C:
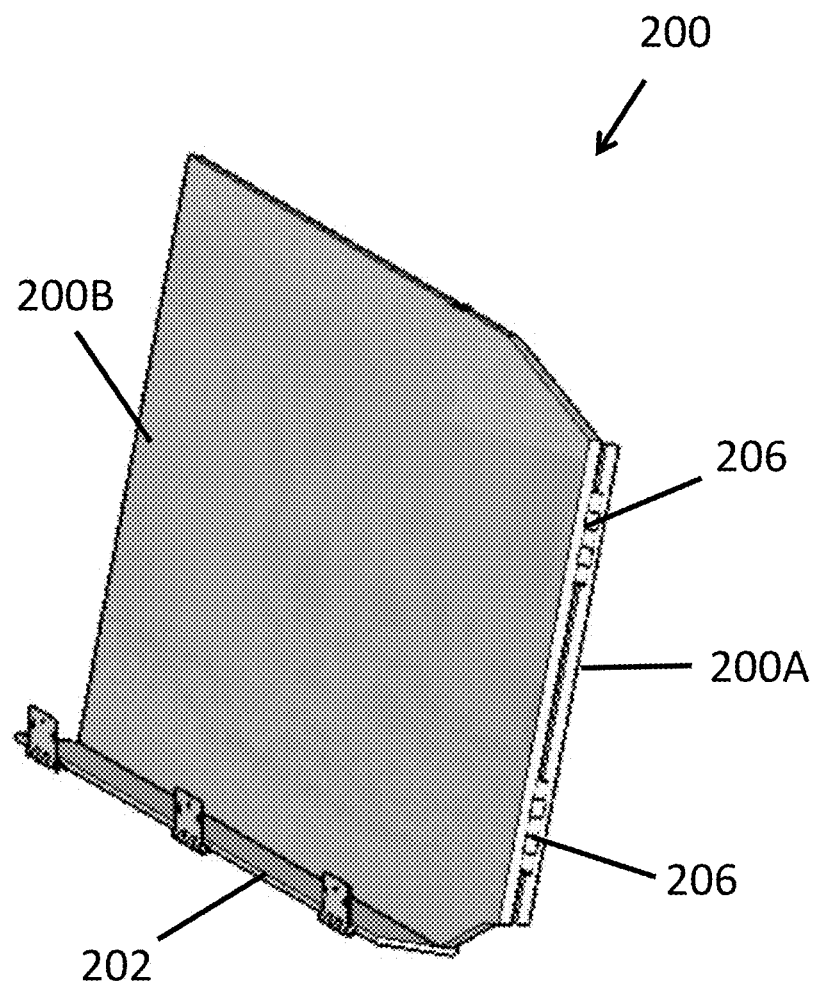
Figure 18A:
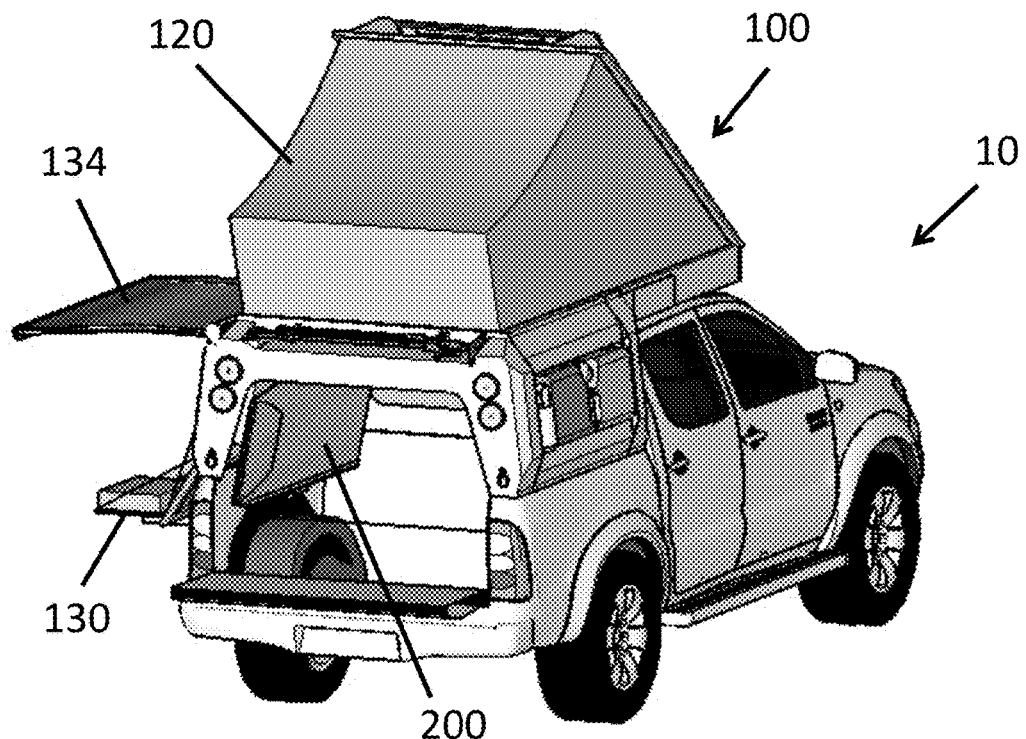
Figure 18B:
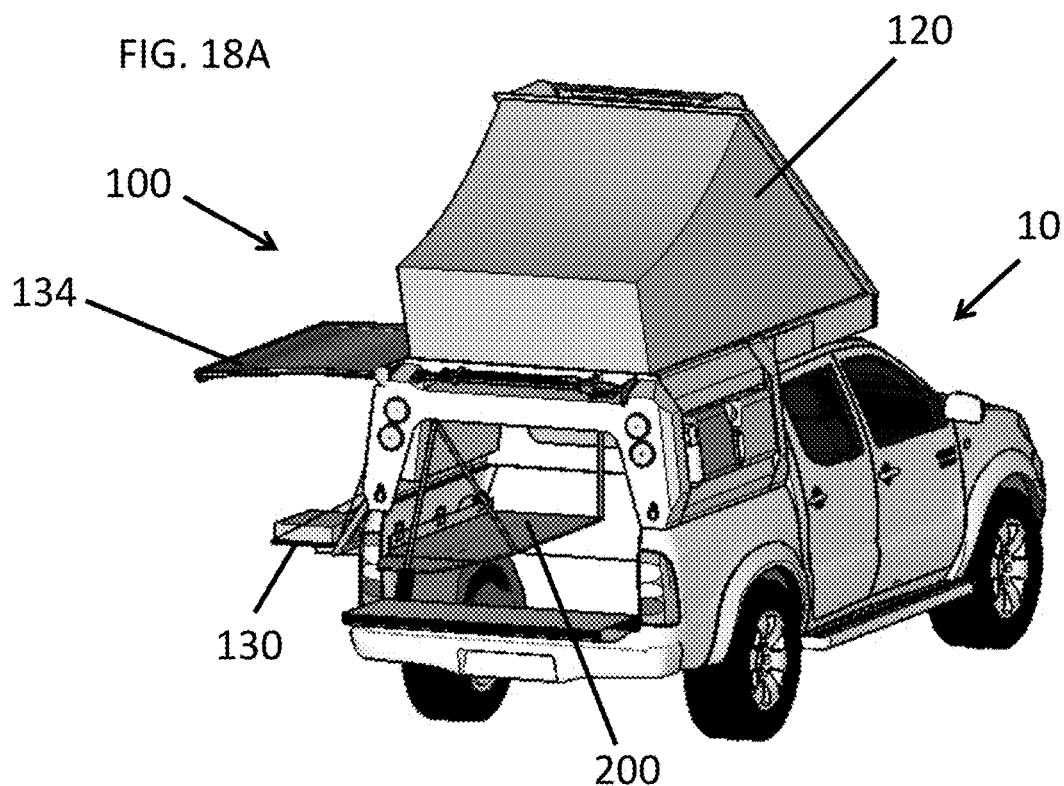
Figure 19A:
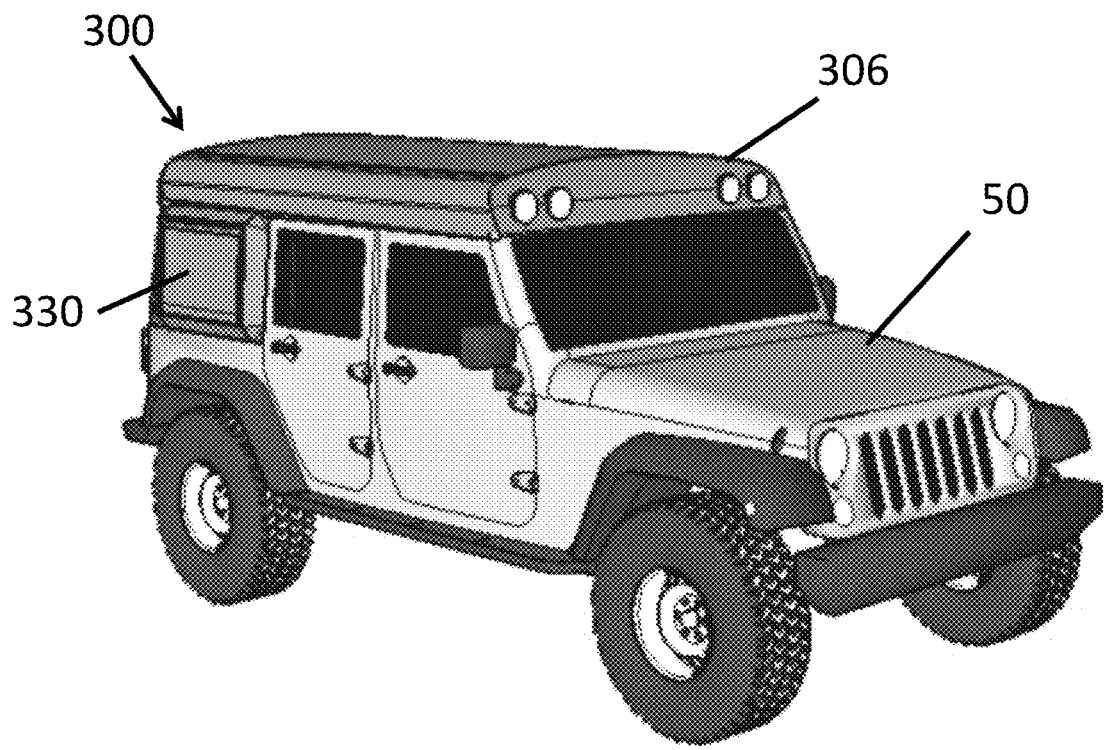
Figure 19B:
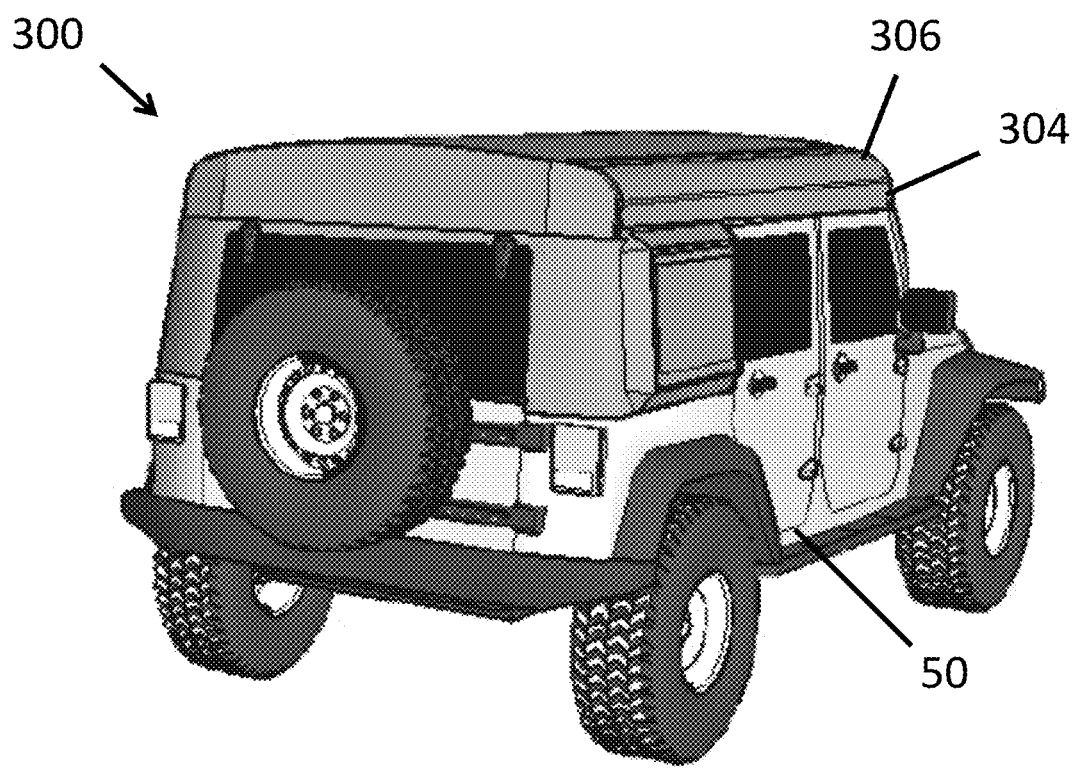
Figure 20A:
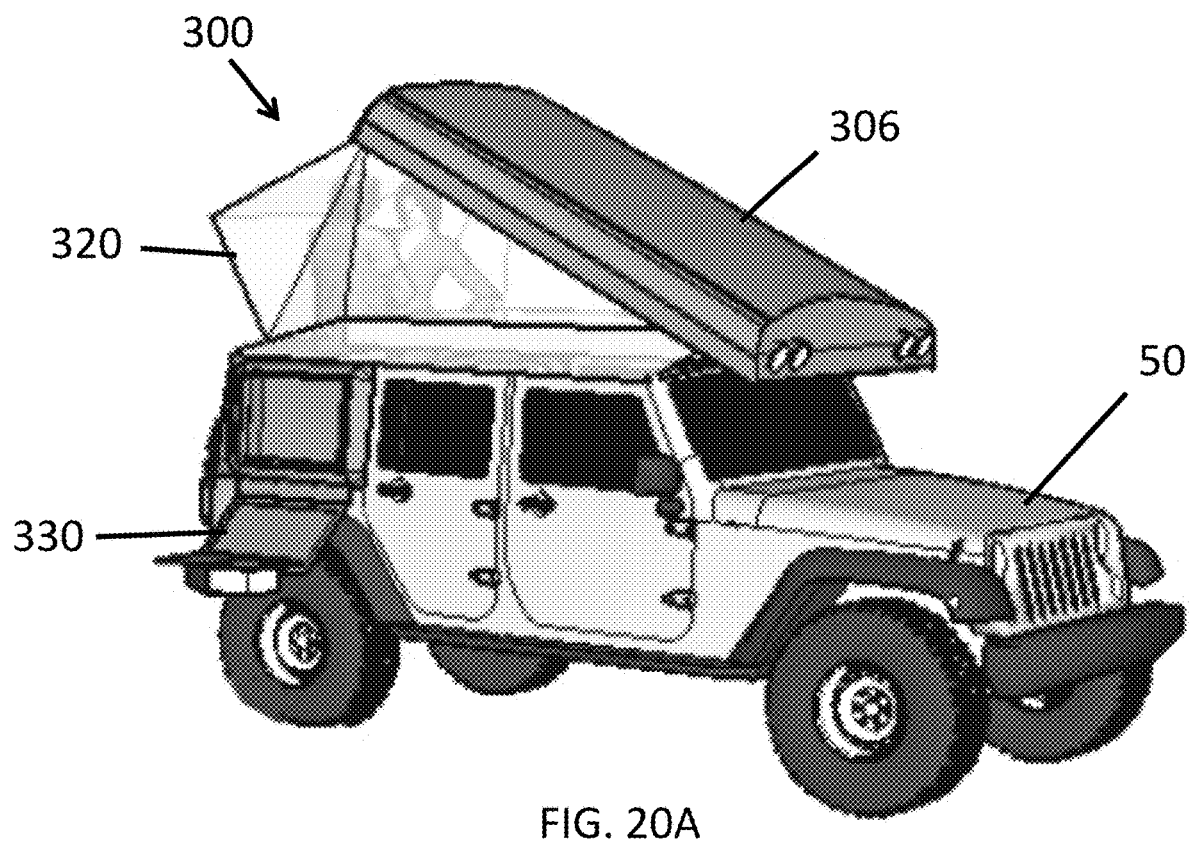
Figure 20B:
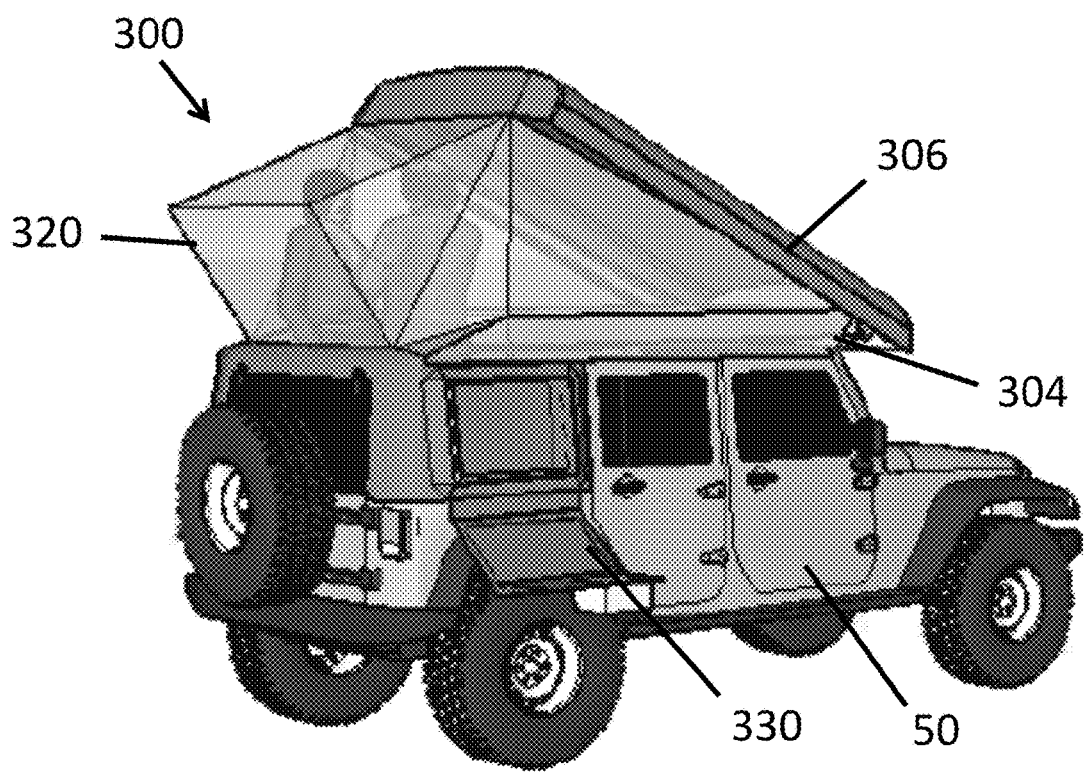
Figure 21:
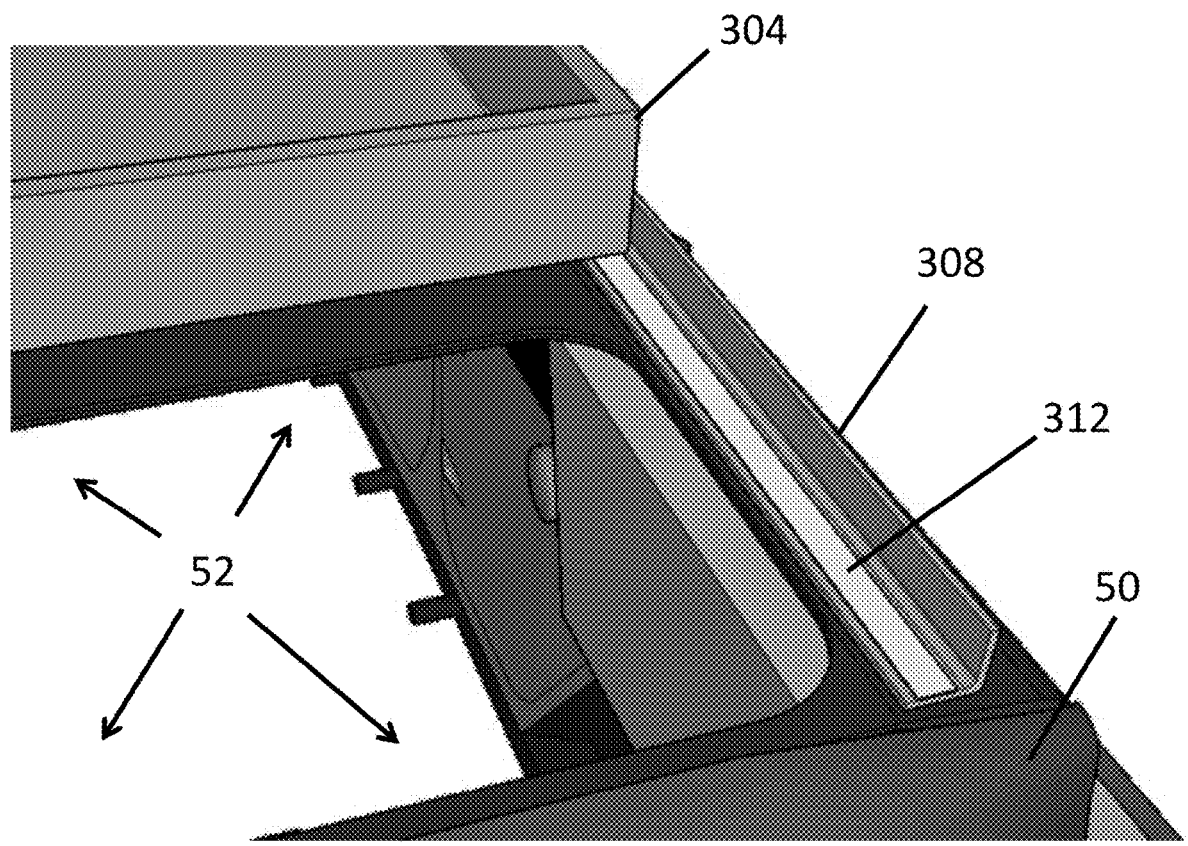

15B is a right side view of the camper shell of the present invention with the bed platform extended and the camper tent fully deployed;

FIGS. 16A and 16B are perspective views of the camper tent, fully deployed;

FIG. 16C is a perspective view of the camper tent, partially deployed;

FIG. 17A is a bottom perspective view of an embodiment of a foldable bed platform in the camper shell of the present invention, the platform being in the unfolded, sleeping configuration;

FIG. 17B is a top perspective view of the bed platform of FIG. 17A in the unfolded, sleeping configuration;

FIG. 17C is a left rear perspective view of the foldable bed platform of FIG. 17A in the folded configuration;

FIG. 18A is a rear perspective view of a truck with the camper shell of the present invention fully deployed and with the bed platform of FIG. 17A in the folded configuration;

FIG. 18B is a rear perspective view of a truck with the camper shell of the present invention fully deployed and with the bed platform of FIG. 17A in the unfolded, sleeping configuration;

FIG. 19A illustrates a front perspective view an embodiment of a camper shell of the present invention in the closed position secured to the roof of a vehicle;

FIG. 19B illustrates a rear perspective view of the camper shell of FIG. 19A;

FIG. 20A illustrates a front perspective view the camper shell of FIG. 19A in the open position;

FIG. 20B illustrates a rear perspective view of the camper shell of FIG. 19A in the open position; and FIG. 21 illustrates a roof opening and slide rail for use with the camper shell of FIG. 19A.

DETAILED DESCRIPTION OF THE PREFERRED EMBODIMENT

The described features, structures, or characteristics of the invention may be combined in any suitable manner in one or more embodiments. In the following description, numerous specific details are provided to provide a thorough understanding of embodiments of the invention. One skilled in the relevant art will recognize, however, that the invention can be practiced without one or more of the specific details, or with other methods, components and so forth. In other instances, well-known structures, materials, or operations are not shown or described in detail to avoid obscuring aspects of the invention.

Figure 1:
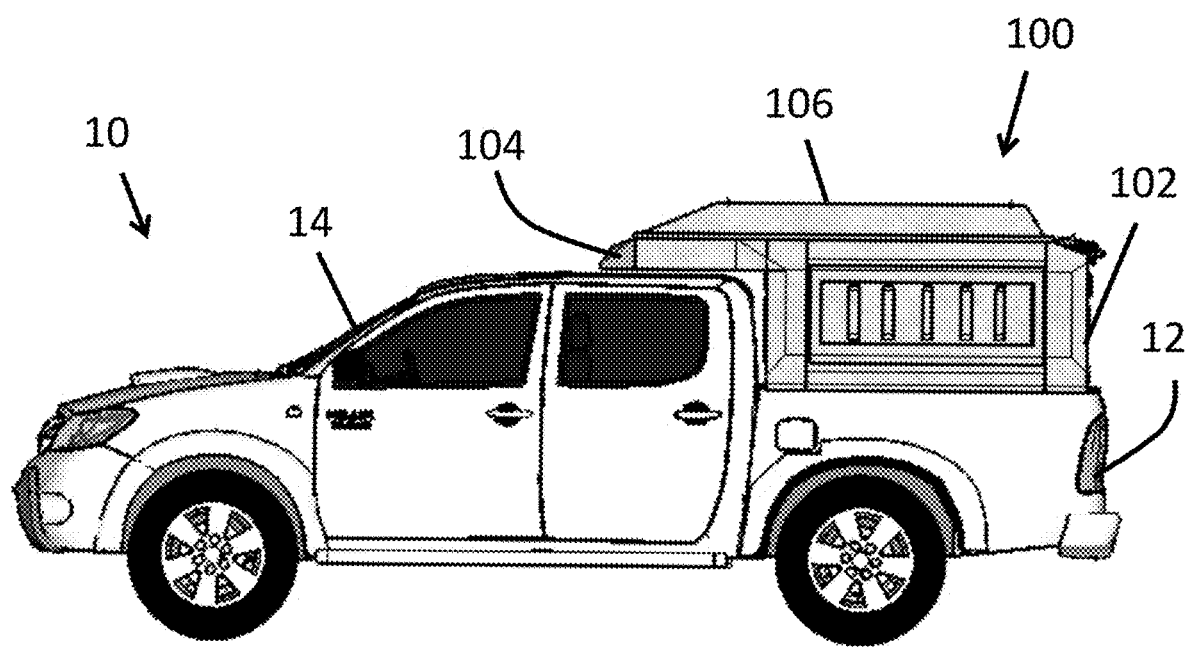
FIG. 1 is a left side view of the pop-up camper shell of the present invention on a pickup truck, with the camper shell in a closed position.
Figure 2:
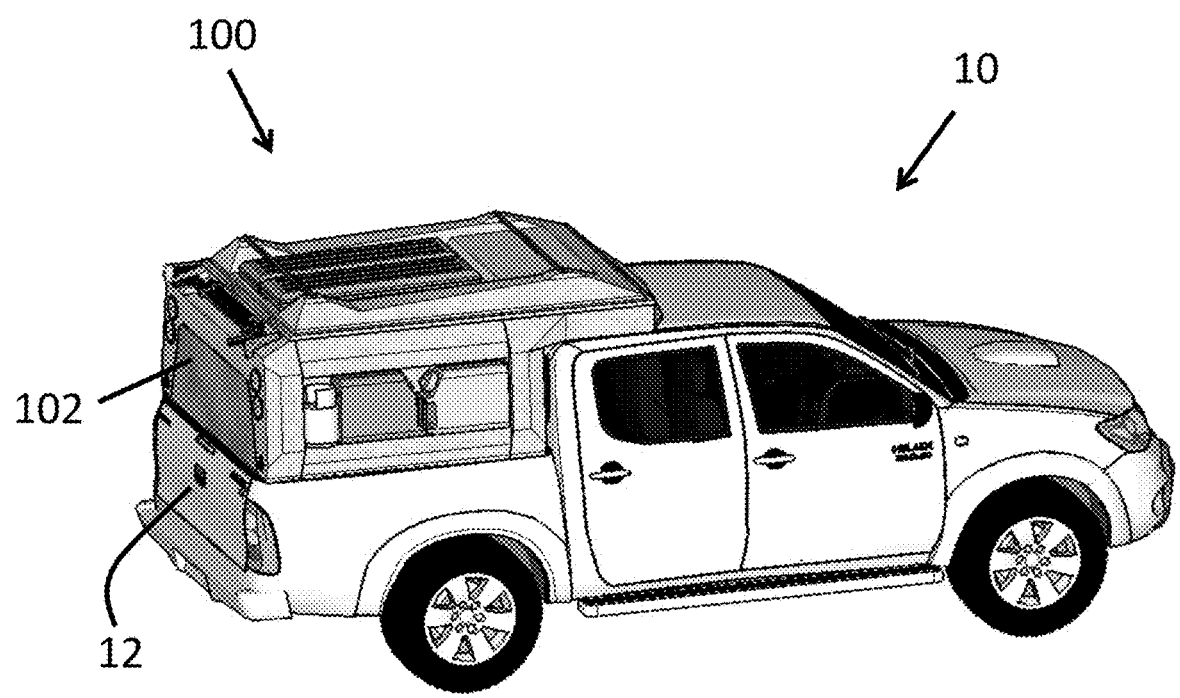
FIG. 2 is a right perspective view of the pop-up camper shell of the present invention on a pickup truck, with the top of the camper shell in the closed position.
Figure 3:
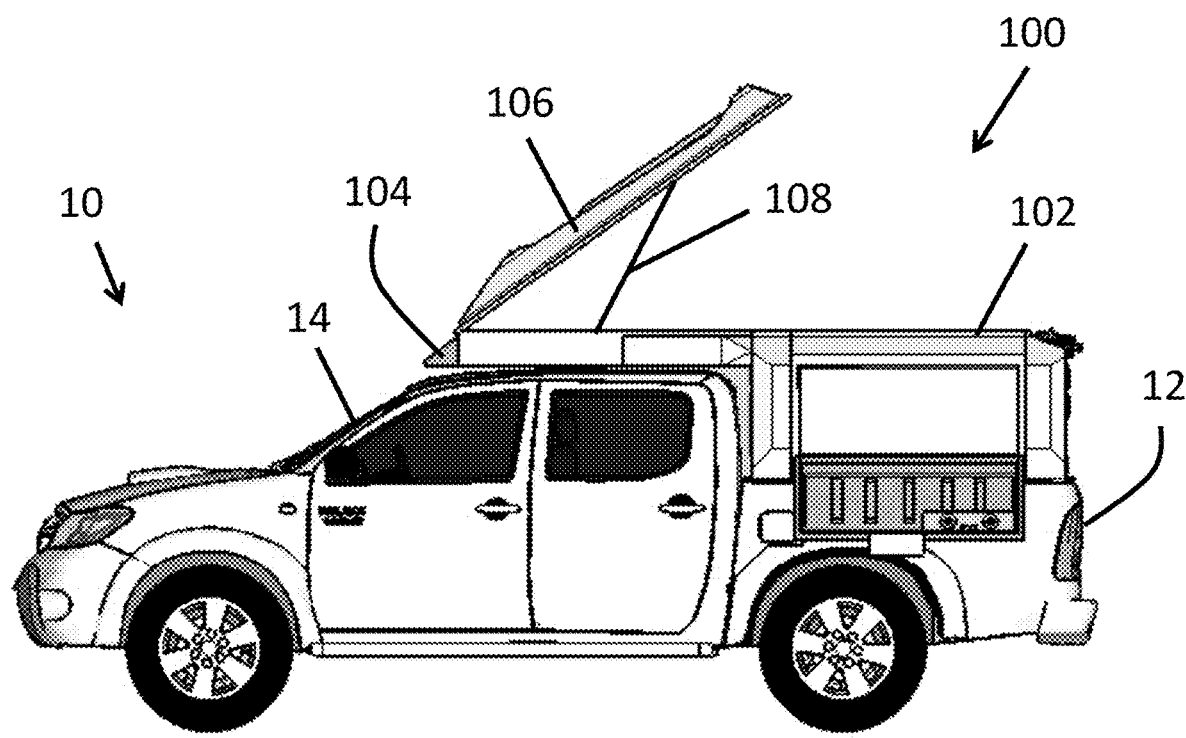
FIG. 3 is a left side view of the pop-up camper shell of the present invention on a pickup truck, with the camper shell in a raised position, without an attached camper tent.
Figure 4A:
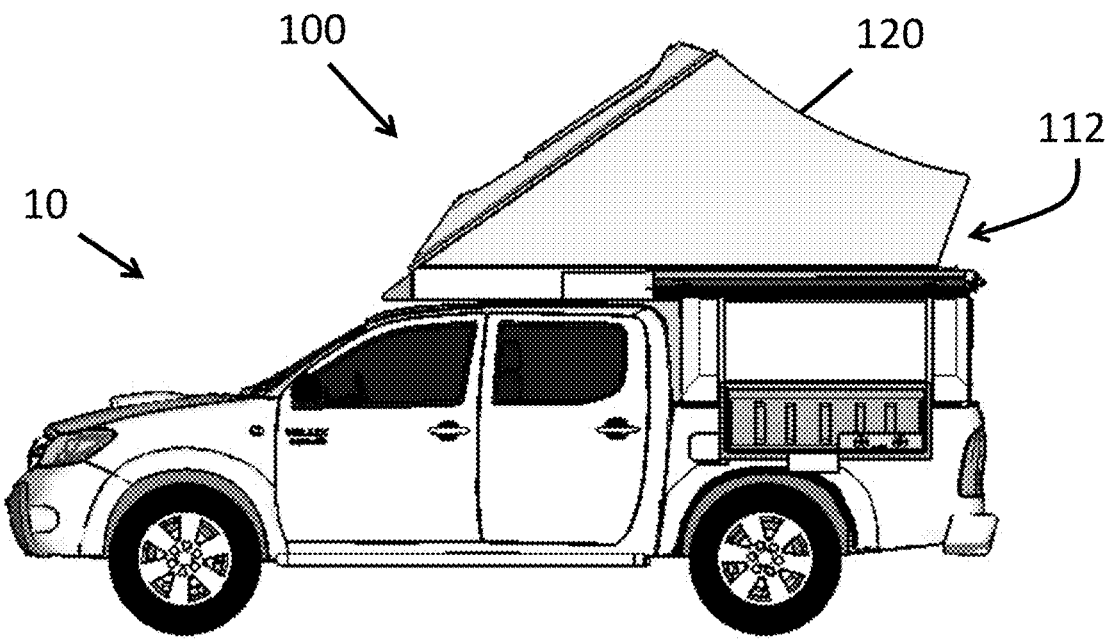
FIG. 4A is a left side view of the pop-up camper shell of the present invention on a pickup truck, with the camper shell in the fully open position and the camper tent being deployed.
Figure 4B:
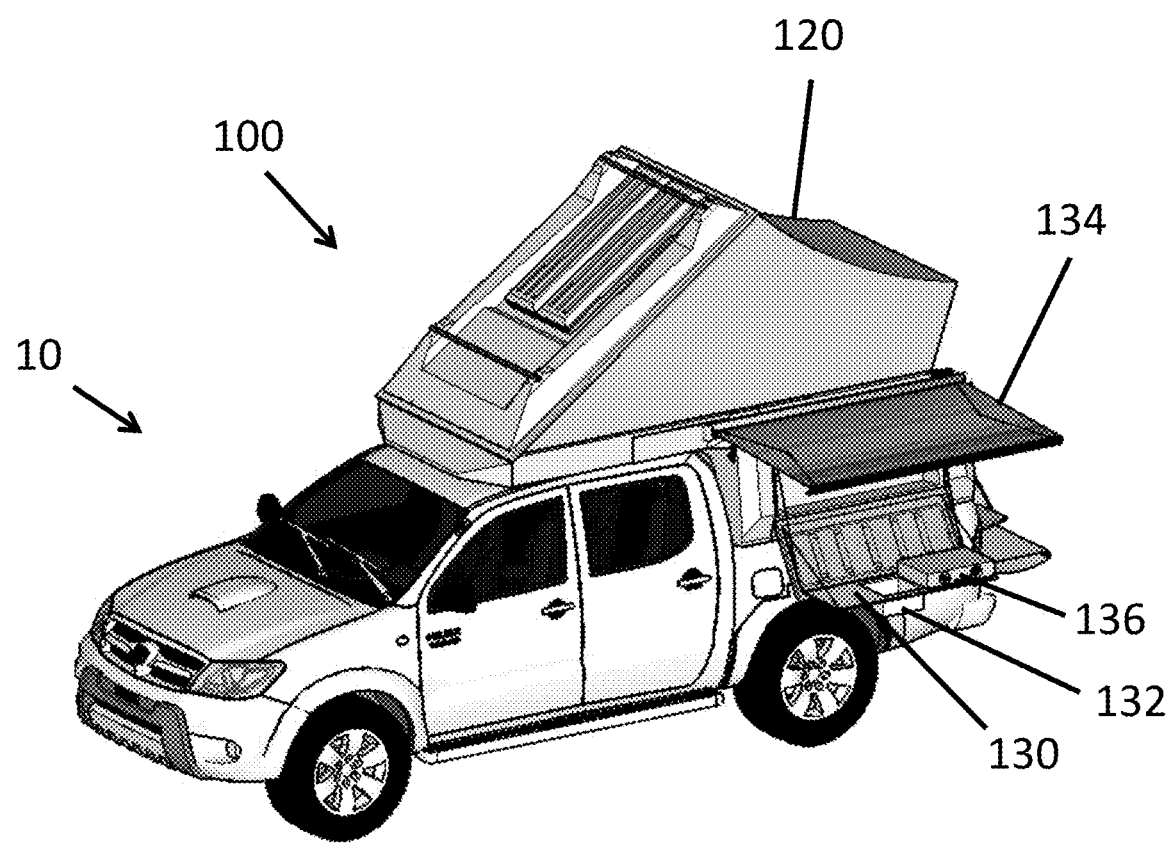
FIG. 4B is a left perspective view of the pop-up camper shell of the present invention on a pickup truck, with the camper shell in the fully open position and the camper tent being deployed.

Embodiments of the present invention provide a pop-up camper shell for a pickup truck with a bed platform that slides forward over the cab of the truck. FIGS. 1-4B illustrate the camper shell 100 mounted on a pickup truck 10. The main body 102 is secured to the tops of the sidewalls of the truck bed 12. A sliding bed platform 104 extends over the cab 14 of the truck 10 and a pop-up top 106 is hingedly connected to the front of the bed platform 104. Any of a number of types of latches may be used to secure the top 106 to the main body 102, and the latches may be lockable to prevent the unauthorized raising of the top 106. As illustrated in FIGS. 1 and 2, the camper shell 100 is a compact unit with a relatively low profile when closed while providing substantial room when fully open (FIGS. 3, 4).

To prepare the camper shell 100 for use, the top 106 is unlatched and raised (FIG. 3). Gas struts 108 may provide a mechanical assist in raising the top 106 and also prop the top 106 in the raised position. The bed platform 104 is also slid forward over an additional portion of the roof of the cab 14 (FIGS. 3, 4A, 4B).

A tent 120, is made of nylon, canvas, other like material and preferably waterproof. The sides of the tent 120 are attached at their bottom edges to the top side edges of an inner liner 110 and the sliding bed platform 104 and attached at their top edges to the bottom side edges of the top 106. The back panel of the tent 120 is attached at its bottom edge to the top rear edge of the inner liner 110 and attached at its top edge to the rear edge of the top 106. When the top 106 is raised, the tent 120 is raised with the top 106. When the bed platform 104 is slid forward, the tent 120 is deployed with it, providing an enclosed sleeping space as well as space to stand up in the truck bed (FIGS. 4A, 4B; see also FIGS. 15A, 15B and 16A-16C). A folding frame 112 may be erected inside the tent 120 to provide internal support and maintain its shape.

Figure 5:
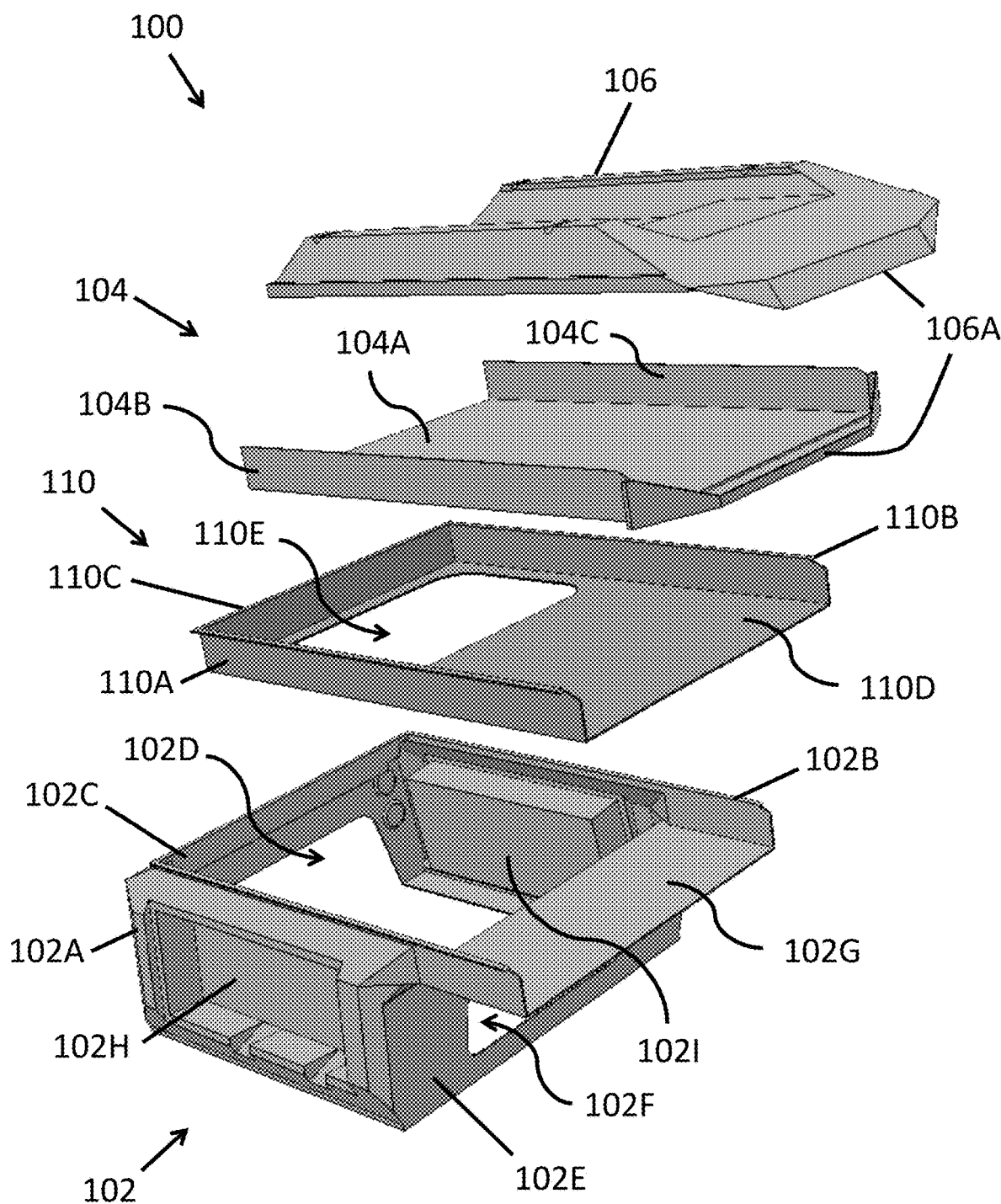
FIG. 5 is an exploded view of the camper shell of the present invention.

FIG. 5 is an exploded view of the principle components of the camper shell 100. The shell 100 includes the main body 102, the sliding bed platform 104, and the top 106. The shell also includes an inner liner or tray 110. More specifically, the main body 102 has no top and includes left and right sides 102A, 102B, a back panel 102C, which may be surrounding a door window opening 102D, a front panel 102E, which may also have a window opening 102F, and a front shelf 102G. Recessed storage spaces 102H, 102I may be provided to be accessible from the outside of the left side 102A, the right side 102B, or both sides of the main body 102.

Figure 6:
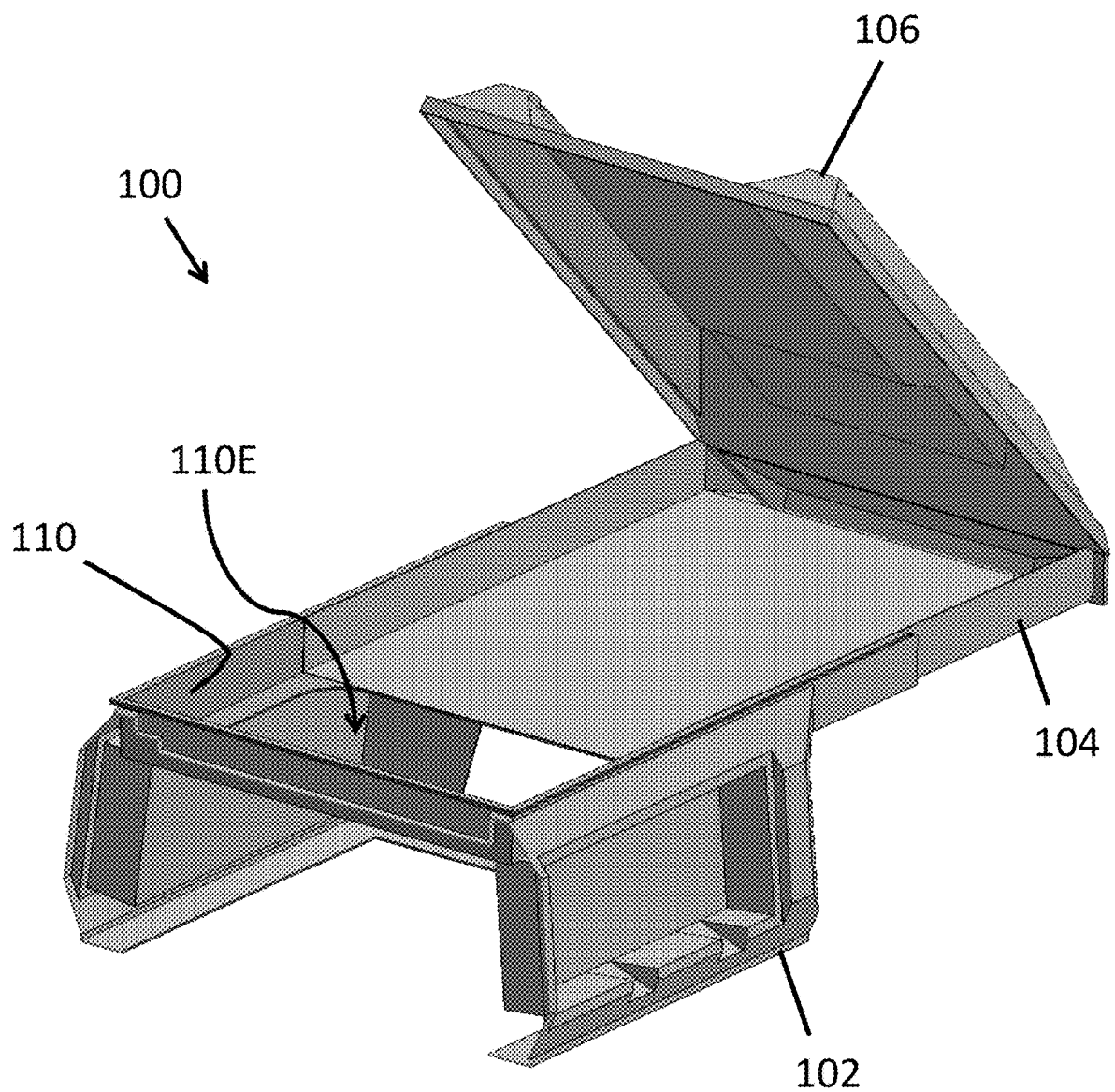
FIG. 6 is a right rear perspective view of the camper shell of the present invention in the fully open position with the rear panel removed.
Figure 7:
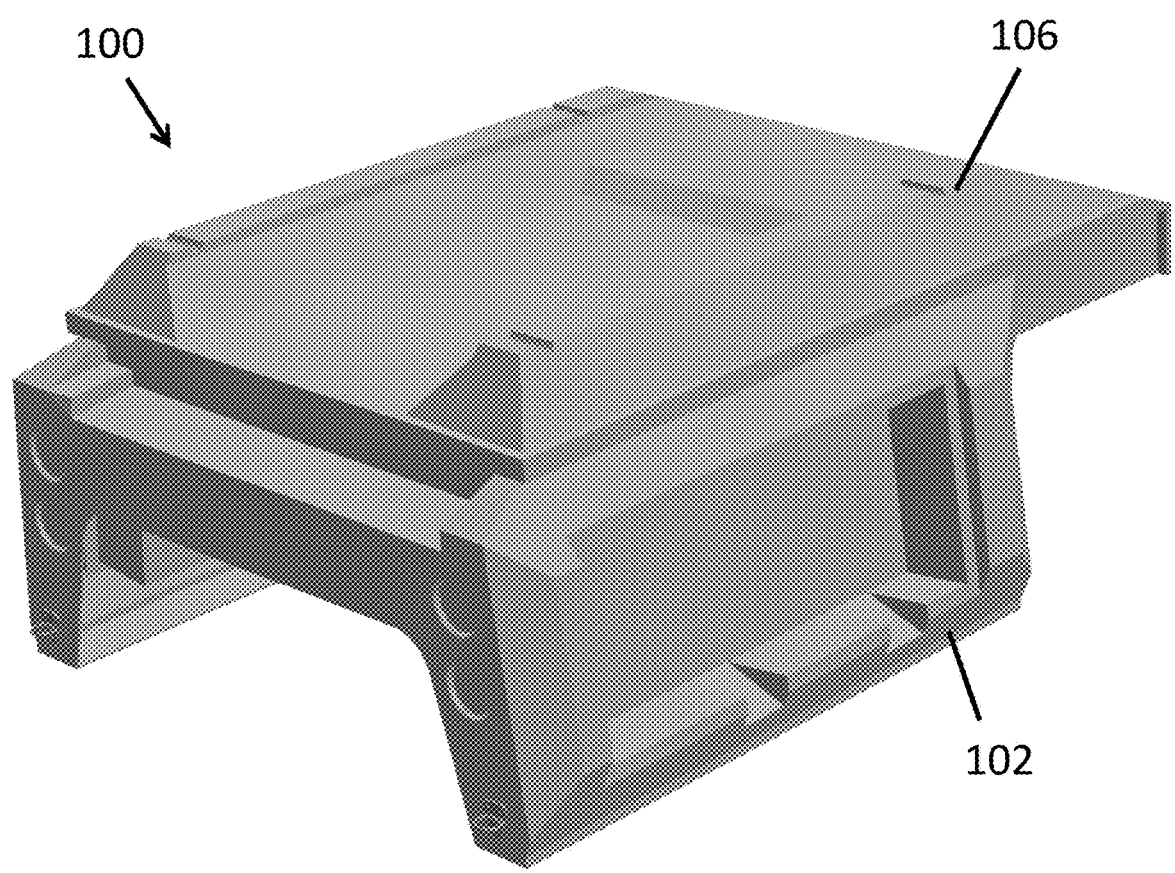
FIG. 7 is a right rear perspective view of the camper shell of the present invention in the closed position.
Figure 8:
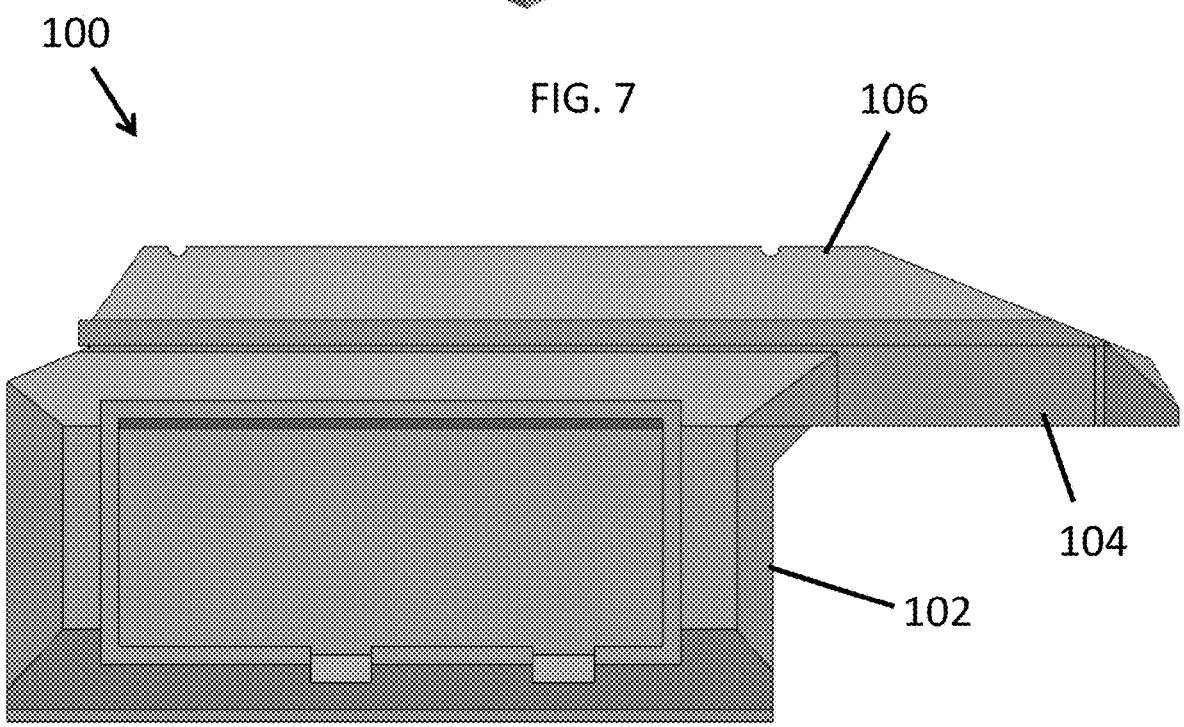
FIG. 8 is a right side view of the camper shell of the present invention in the closed position.

The tray 110 has no top. It has left, right, and back sidewalls 110A, 110B, 110C, an open front, and a bottom panel 110D with a rectangular opening 110E. The tray 110 is secured to the top of the main body 102 as illustrated in FIG. 6, a view of the assembled shell 100 with the rear panel 102C removed.

Figure 9:
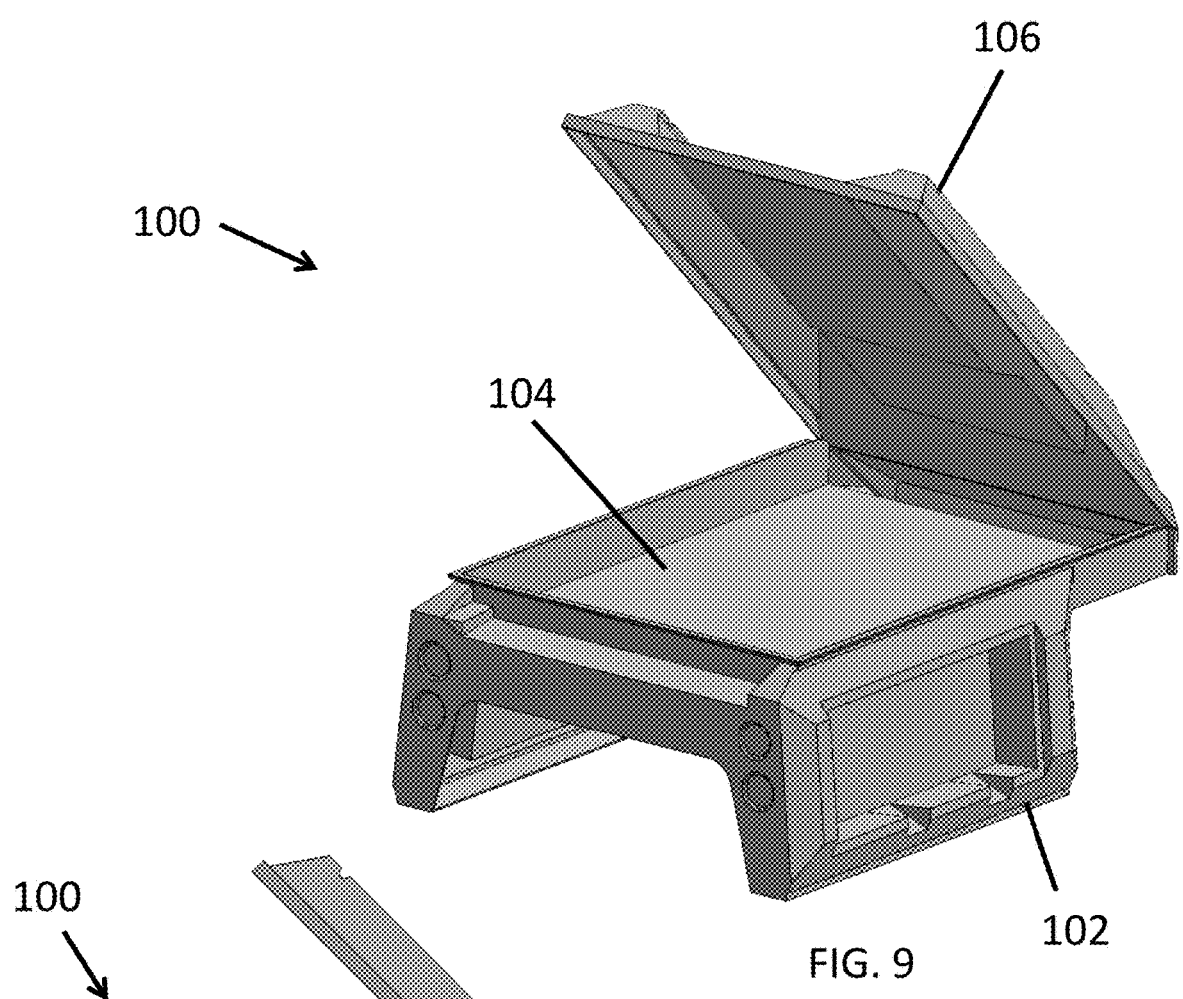
FIG. 9 is a right rear perspective view of the camper shell of the present invention with lid in the raised position.
Figure 10:
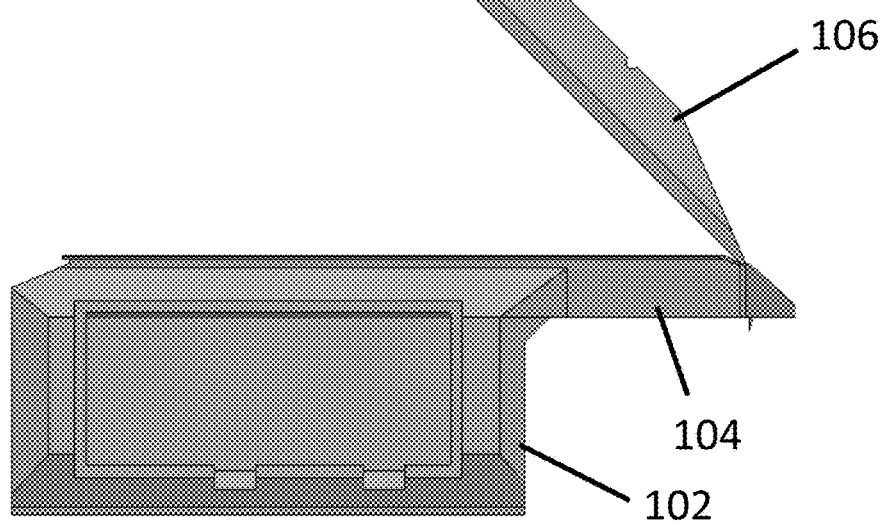
FIG. 10 is a right side view of the camper shell of the present invention with lid in the raised position.

The bed platform 104 includes a bottom panel 104A with two sidewalls 104B, 104C. The bed platform 104 may rest on ultra high molecular weight (UHMW) plastic strips which are attached to the tray 110. The UHMW strips reduce friction, allowing the bed platform 104 to be slid forward (FIGS. 3, 4A, 4B, 6, 11, 12, 15B) and back (FIGS. 1, 2, 7-10, 15A). When the bed platform 104 is in the rearward position, the opening 110E in the tray 110 is closed, as shown in FIG. 9, and when the bed platform 104 is in the forward position, the opening 110E is exposed, as shown in FIGS. 6 and 11.

The top 106 is secured to the bed platform 104 with one or more hinges 106A at the front edge, allowing the top 106 to be tilted upward (FIGS. 3, 4A, 4B, 6, 9-12, 15A, 15B, 18A, 18B) and lowered (FIGS. 1, 2, 7, 8, 13-14B).

Figure 12B:
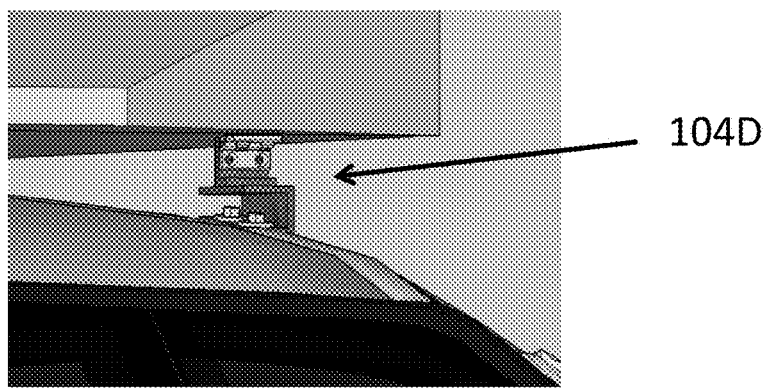
FIG. 12B is a close-up view from FIG. 12A of a foldable leg for supporting the front of the camper shell.

If desired, feet 104D may be secured to the bottom of the bed platform 104 (FIGS. 12A, 12B). The feet 104D may be hinged to fold up against the bottom of the bed platform 104 when not in use. When extended downward, the feet 104D rest against supports mounted in the "ditch" in the roof of the cab 14, preventing the front of the bed platform 106 from sagging when a person is lying inside. The "ditch" is a welded joint that joins the door frame to the cab roof of the truck. It runs longitudinally from the front window of the cab to the rear window of the cab. Auto manufacturers place weld nuts in the ditch for attachment of accessories. The supports utilize the weld nuts for mounting in the ditch.

When the camper shell 100 is in the fully open position and the tent 120 set up, a camper can climb through the opening 110E in the tray 110 onto the bed platform 104 for sleeping, or stand in the opening 110E to change clothes, etc.

Figure 13:
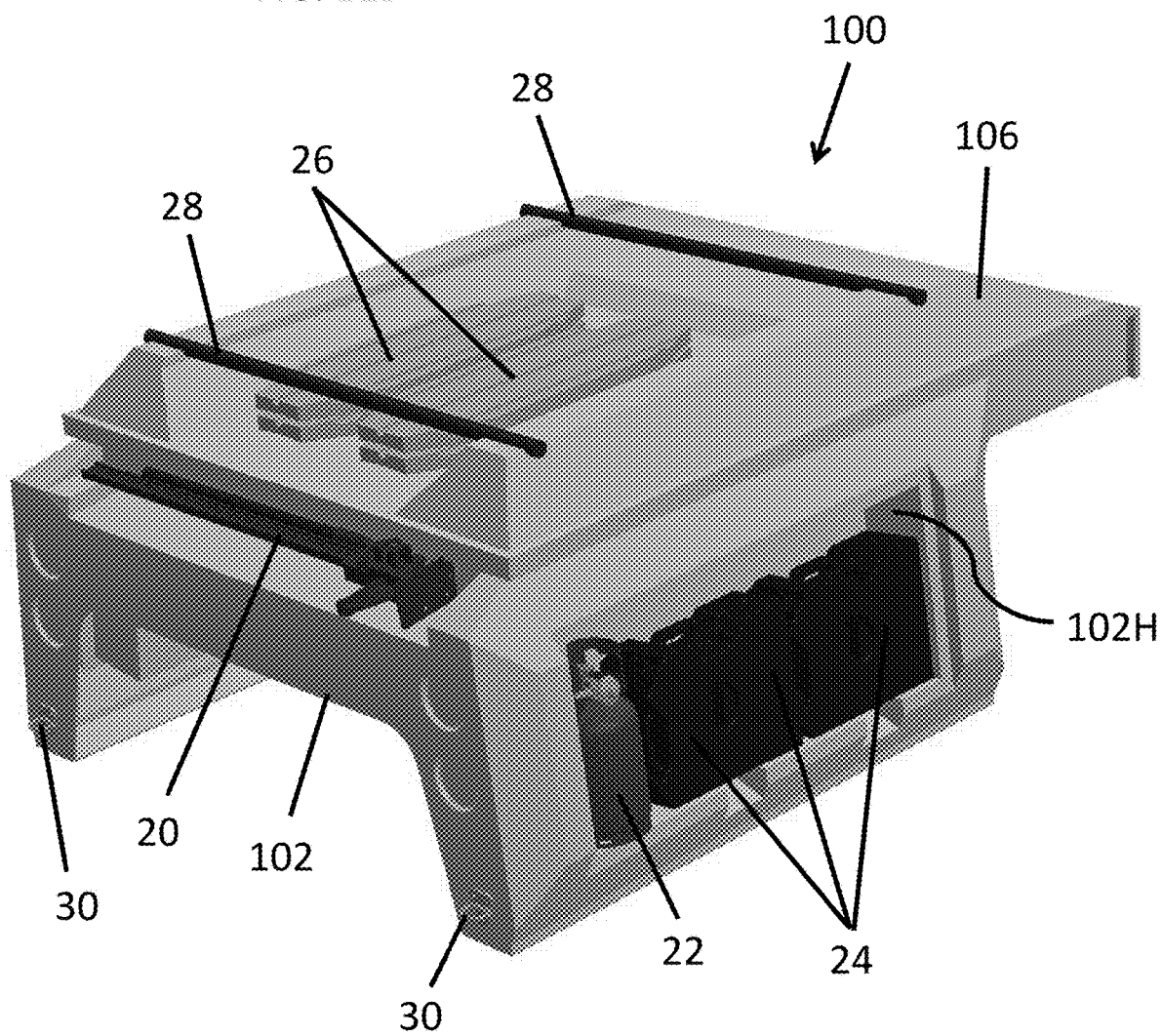
FIG. 13 a right rear perspective view of the camper shell of the present invention in the closed position with various camping accessories in provided storage locations.

The camper shell 100 may include compartments and recesses configured to accommodate accessories. FIG. 13 a right rear perspective view of the camper shell of the present invention with various camping accessories in provided storage locations. These accessories may include a jack 20, mounted in brackets on top of the main body 102 behind the top 106; a propane tank 22 and one or more gas or water cans 24 stowed in the recessed compartment 102H and secured, such as with straps and cam buckles; traction aids, such as MaxTrax® 26, secured on top of the top 106; roof rack cross bars 28 for carrying canoes, kayaks, bicycles, skis, etc.; and tie-down rings 30.

Figure 14A:
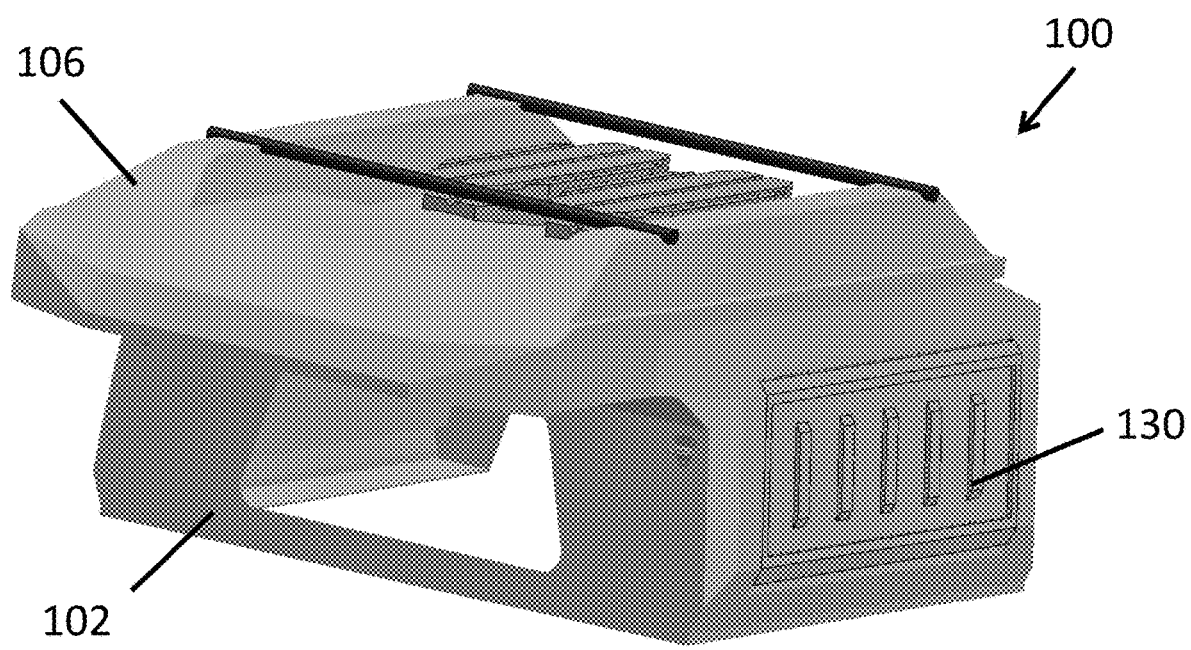
FIG. 14A is a front left perspective view of the camper shell of the present invention in the closed position with a storage compartment closed.
Figure 14B:
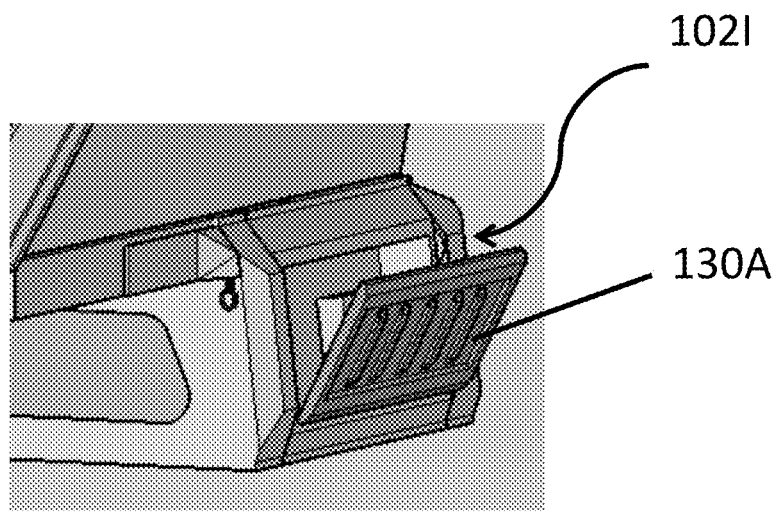
FIGS. 14B-14D are sequential close-up views of the storage compartment being opened.
Figure 14C:
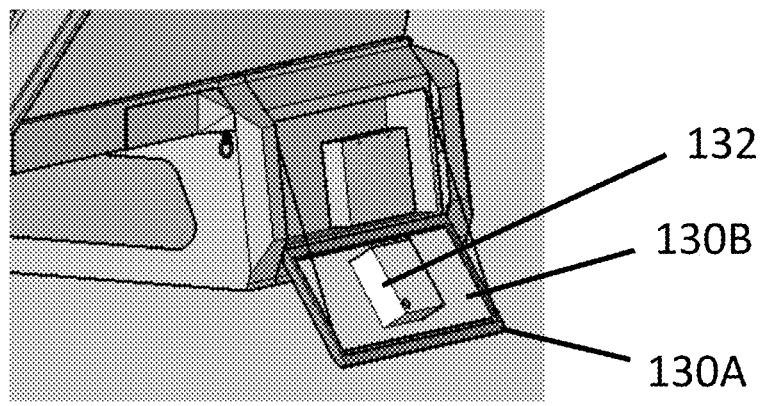
Figure 14D:
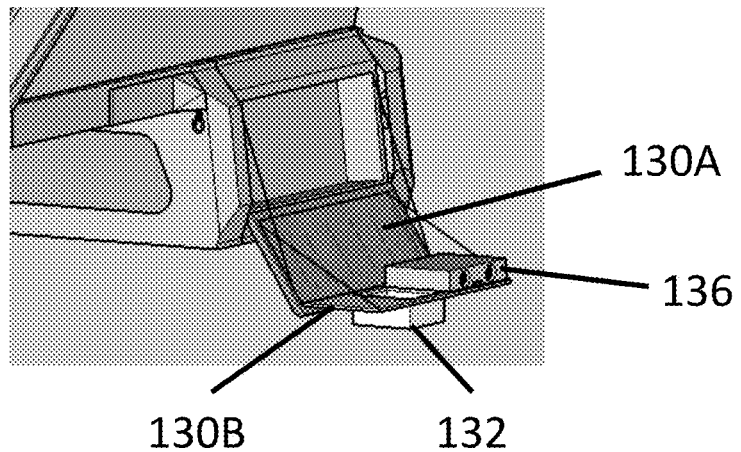
Figure 15A:
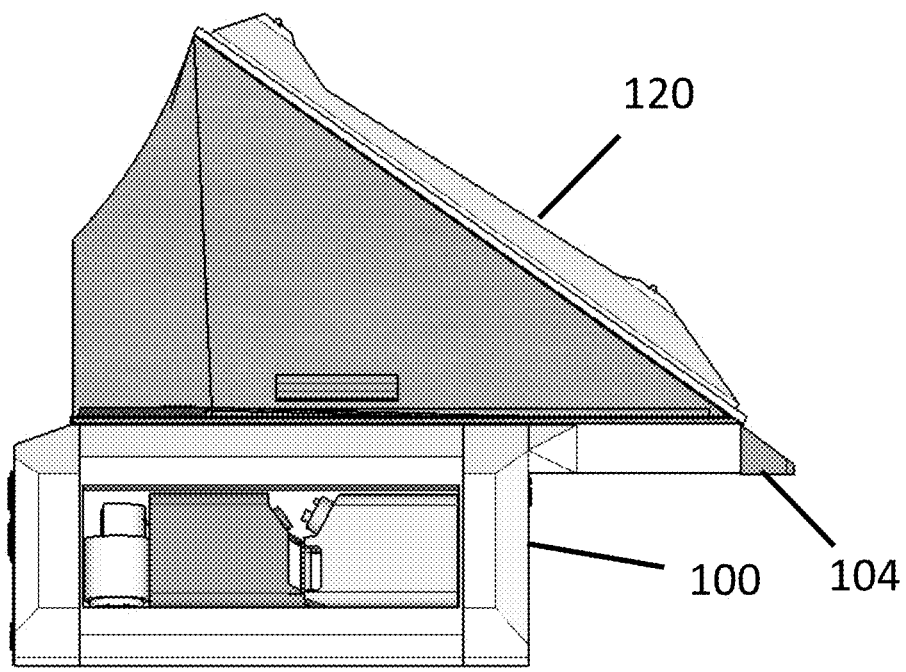
FIG. 15A is a right side view of the camper shell of the present invention with the bed platform retracted and the camper tent partially deployed.
Figure 15B:
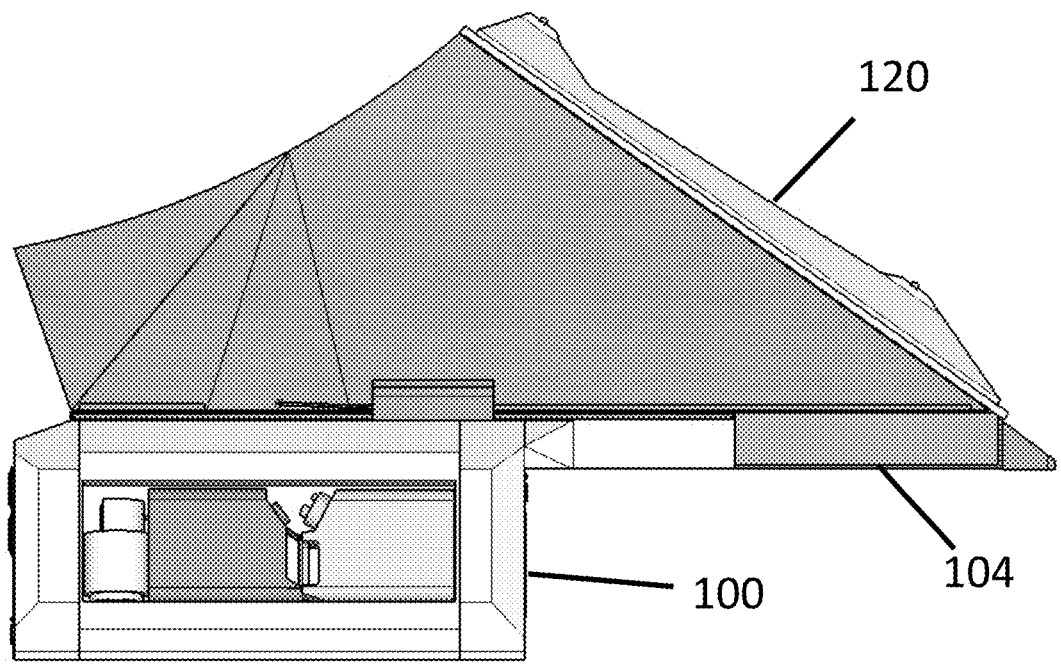

FIG. 14A is a front left perspective views of the camper shell 100 with the recessed storage compartment 102I closed with a cover 130 in place over the compartment 102I (FIG. 14B). The cover 130 may be lockable to prevent unauthorized access to the contents of the compartment 102I. FIGS. 14B-14D are sequential close-up views of the compartment 102I being opened. The compartment cover 130 may be secured to the lower edge of the compartment 102I with one or more hinges and to the upper edge with straps or cables, allowing it to fold down while remaining attached to the shell 100. In addition, as illustrated in the embodiment of FIG. 14B, the compartment cover 130 may include a first section 130A attached to the compartment 102J and a second section 130B attached by a hinge to the first section 130A. The second section 130B, also supported from the shell 100 with cables or straps, may hold a portable sink 132, a portable stove 136, or both. When the cover 130 is fully open, the sink 132 is substantially level. To close the cover 130, the sink is emptied and the second section 130B is folded against the first section 103A. The first section 103A, with the second section 130B and the top of the sink 132 folded against it, may then be folded up to close the compartment 102J. The bottom of the sink 132 will be facing the inside of the compartment 102J.

FIG. 4B illustrates other accessories that may be included with the shell 100, such as a roller-type awning 134. The second section 130B of the cover 130 may be wide enough to accommodate the sink 132 and serve as a counter for a portable stove 136 as well as for food preparation and cleaning.

In addition to the bed platform 104 providing an extended sleeping area over the truck cab 14, the shell 100 may include one or more sleeping platforms in the main body 102. FIGS. 17A-17C illustrate an embodiment of such a platform 200. The platform 200 may be secured with a bracket 202 to a side of the inside of the main body 102 with a single or multiple hinges 204 along the bottom of the platform 200 (FIG. 17A). A front section 200A may be hinged (206) to a main section 200B. When not in use, the front section 200A may be folded back against the main section 200B (FIG. 17C) and the entire platform 200 folded up and secured against the side of the main body 200. The bunks may be supported with straps or cables 208 (FIG. 17B) that move out of the way when the platform 200 is in the stored position. A small magnet 210A may mounted on the underside of the front section 200A of the bunk 200 (FIG. 17A). A matching metal plate 210B may be mounted on the underside of the main section 200B. When in the stored position, the magnet 210A retains the front section 200A against the main section 200B so that it does not move while the truck is in motion. Other means may be used instead or in addition to the magnet/plate 210A/210B combination. The main section 200B of the platform 200 may be offset from the mounting hinges 204 by about 3 inches. This allows space for a sleeping bag and sleeping pad when the platform 200 is in the stored position. FIGS. 18A and 18B are views of the back of the shell 100 mounted on a truck showing the platform 200 in the folded and unfolded positions, respectively. Although the platform 200 is shown on only one side of the shell 100, another platform 200 may be installed on the other side as well. Depending on the length of the truck bed, the platform 200 may extend beyond the end of the truck bed with the tailgate open.

While FIGS. 1-18 illustrate embodiments of a camper shell 100 mounted on a pick-up truck 10, embodiments may also be mounted on the roof of vehicles, such as some sport utility vehicles (SUVs), such as Jeep® Wranglers and the like. FIG. 19A, 19B illustrate perspective views of an embodiment of a camper shell 300 mounted on a Jeep® Wrangler 50. The shell 300 includes a sliding bed platform 304, a pop-up top 306, and a tent 320. An opening 52 may be cut in the roof of the vehicle 50 (FIG. 21) such that, when the bed platform 304 is slid forward and the tent 320 is deployed (FIGS. 20A, 20B), the tent may be accessed through the opening 52 in the roof. Slide rails 308 secured to the roof along the sides of the opening 52 and extending the length of the roof allow the bed platform 304 to be slid open and closed to expose the opening 52. The opening 52 may be approximately 20 inches by 50 inches. Low friction strips 312, such as UHMW strips, may line the horizontal surface of the slide rails 308 to provide smoother operation of the bed platform 304. If desired, one or both rear side windows may be removed from the vehicle and replaced by one or more closable storage compartments 330 on one or both sides. It will be appreciated that the dimensions of the shell 300 and the opening 52 may be varied to fit any of a number of vehicles. Brackets may used to bolt the rails 308 through the roof of the vehicle 50 to a roll bar inside the vehicle or to roof rack mounts. A panel may be used to close and seal the opening 52 if the shell 300 is removed.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A pop-up camper shell, comprising:
    a pair of slide rails;
    a bed platform slideable along the slide rails from a rearward position to a forward position;
    a pop-up top hingedly secured to a front of the bed platform, the pop-up top having a closed position covering the bed platform and a tilted position; and
    a tent, comprising:
        a pair of opposing sides secured along bottom edges to sidewalls of the bed platform and secured along top edges to bottom side edges of the pop-up top; and
        a rear panel secured along a top edge to a rear edge of the pop-up top and extending downward;
    whereby, when the bed platform is in its forward position and the pop-up top in its tilted position, the tent deploys to define an enclosed space.

2. The pop-up camper shell of claim 1, wherein the slide rails are securable to the roof of a vehicle having an opening formed therein, such that the opening in the roof is closed when the bed platform is in the rearward position and the opening in the roof is exposed when the bed platform is in the forward position, and wherein a bottom edge of the rear panel of the tent is securable to a rear edge of the opening in the roof.

3. The pop-up camper shell of claim 1, further comprising a recessed storage compartment insertable into a window opening of the vehicle.

4. The pop-up camper shell of claim 3, further comprising a lockable cover over the recessed storage compartment.

5. The pop-up camper shell of claim 3, further comprising a fold-down sink within the recessed storage compartment.

6. The pop-up camper shell of claim 1, further comprising an open-top body securable within a bed of a pick-up truck, comprising:
   left and right sides;
   a back panel;
   a front panel; and
   a front shelf extending from the tops of the left and right sides above the front panel; and
   a tray, secured to flanges around inside top edges of the left and right sides, the back panel, and the front panel of the body, the tray comprising opposing sidewalls, a rear wall, and a bottom panel having an opening formed in a rear portion thereof, a bottom edge of the rear panel of the tent is secured to a rear edge of the tray, and the pair of slide rails secured to opposing sides of the opening in the tray whereby the bed platform is slideable within the tray along the side rails.

7. The pop-up camper shell of claim 6, further comprising at least one recessed storage compartment in at least one of the left and right sides.

8. The pop-up camper shell of claim 7, further comprising a lockable cover over the at least one recessed storage compartment.

9. The pop-up camper shell of claim 7, further comprising a fold-down sink within the at least one recessed storage compartment.

10. The pop-up camper shell of claim 1, further comprising a strut secured between a sidewall of the bed platform and the pop-up top and configured to assist raising the pop-up top from the closed position and maintaining the pop-up top in the tilted position.

11. The pop-up camper shell of claim 1, further comprising a foldable tent support frame.

12. A pop-up camper shell, comprising:
   an open-top body securable within a bed of a pick-up truck, comprising:
      left and right sides;
      a back panel;
      a front panel; and
      a front shelf extending from the tops of the left and right sides above the front panel;
   a tray, secured to flanges around inside top edges of the left and right sides, the back panel, and the front panel of the body, the tray comprising opposing sidewalls, a rear wall, and a bottom panel having an opening formed in a rear portion thereof;
   a bed platform slideable within the tray from a rearward position, in which the opening is closed, to a forward position, in which the opening is exposed;
   a pop-up top hingedly secured to a front of the bed platform, the pop-up top having a closed position covering the bed platform and a tilted position;
   a tent, comprising:
      a pair of opposing sides secured along bottom edges to the sidewalls of the tray and the bed platform and secured along top edges to bottom side edges of the pop-up top; and
      a rear panel secured along a bottom edge to the rear wall of the tray and secured along a top edge to a rear edge of the pop-up top;
   whereby, when the bed platform is in its forward position and the pop-up top in its tilted position, the tent deploys to define an enclosed space.

13. The pop-up camper shell of claim 12, further comprising a pair of slide rails secured to sides of the tray along which the bed platform is slideable.

14. The pop-up camper shell of claim 12, further comprising at least one recessed storage compartment in at least one of the left and right sides.

15. The pop-up camper shell of claim 14, further comprising a lockable cover over the at least one recessed storage compartment.

16. The pop-up camper shell of claim 14, further comprising a fold-down sink within the at least one recessed storage compartment.

17. The pop-up camper shell of claim 12, further comprising a strut secured between a sidewall of the bed platform and the pop-up top and configured to assist raising the pop-up top from the closed position and maintaining the pop-up top in the tilted position.

18. The pop-up camper shell of claim 12, further comprising a foldable tent support frame.

* * * * *